Feb. 8, 1955
H. W. KLEIST
2,701,455
HEATED PLATE UNIT FOR DEFROSTING SYSTEMS
Filed July 23, 1952
3 Sheets-Sheet 2
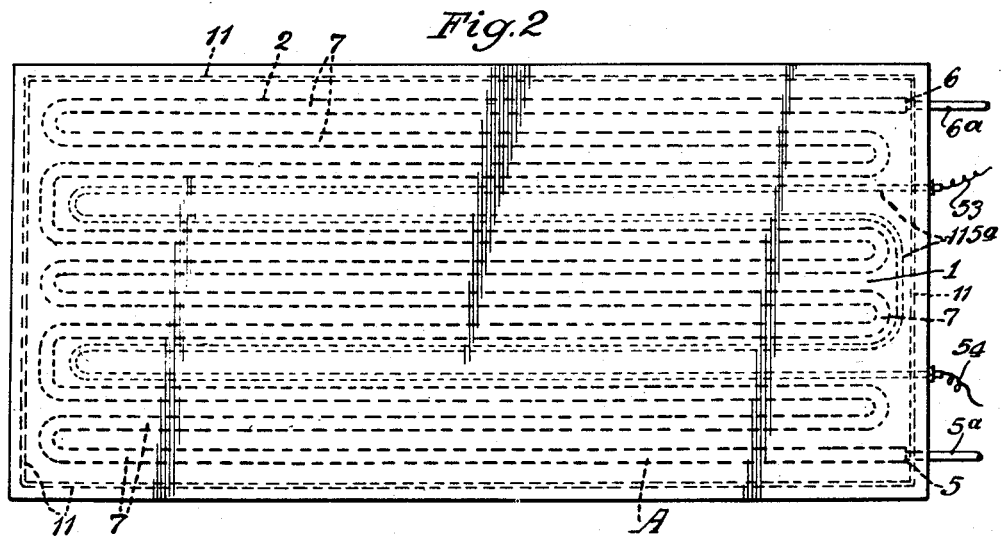
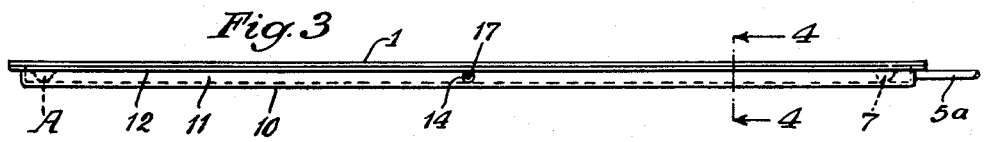
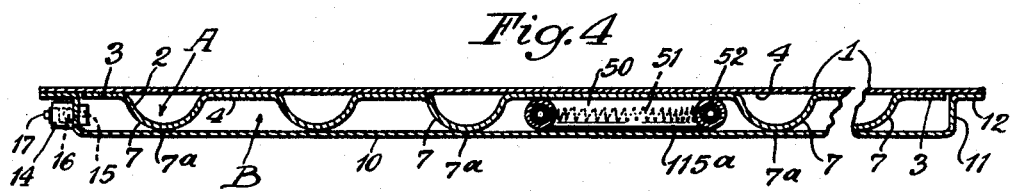
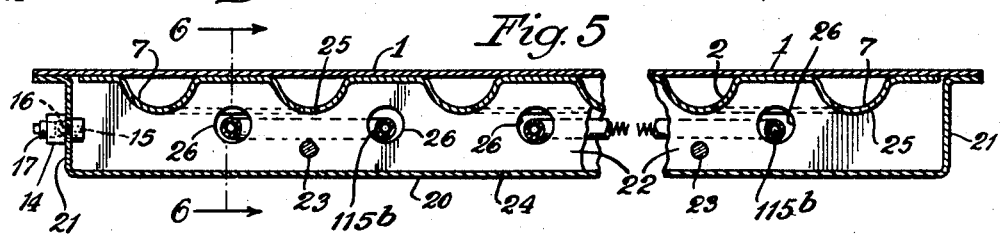
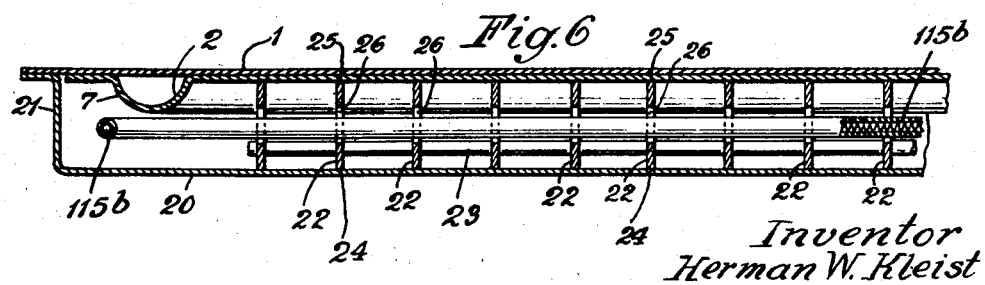
Inventor
Herman W. Kleist
by Parker & Carter
Attorneys

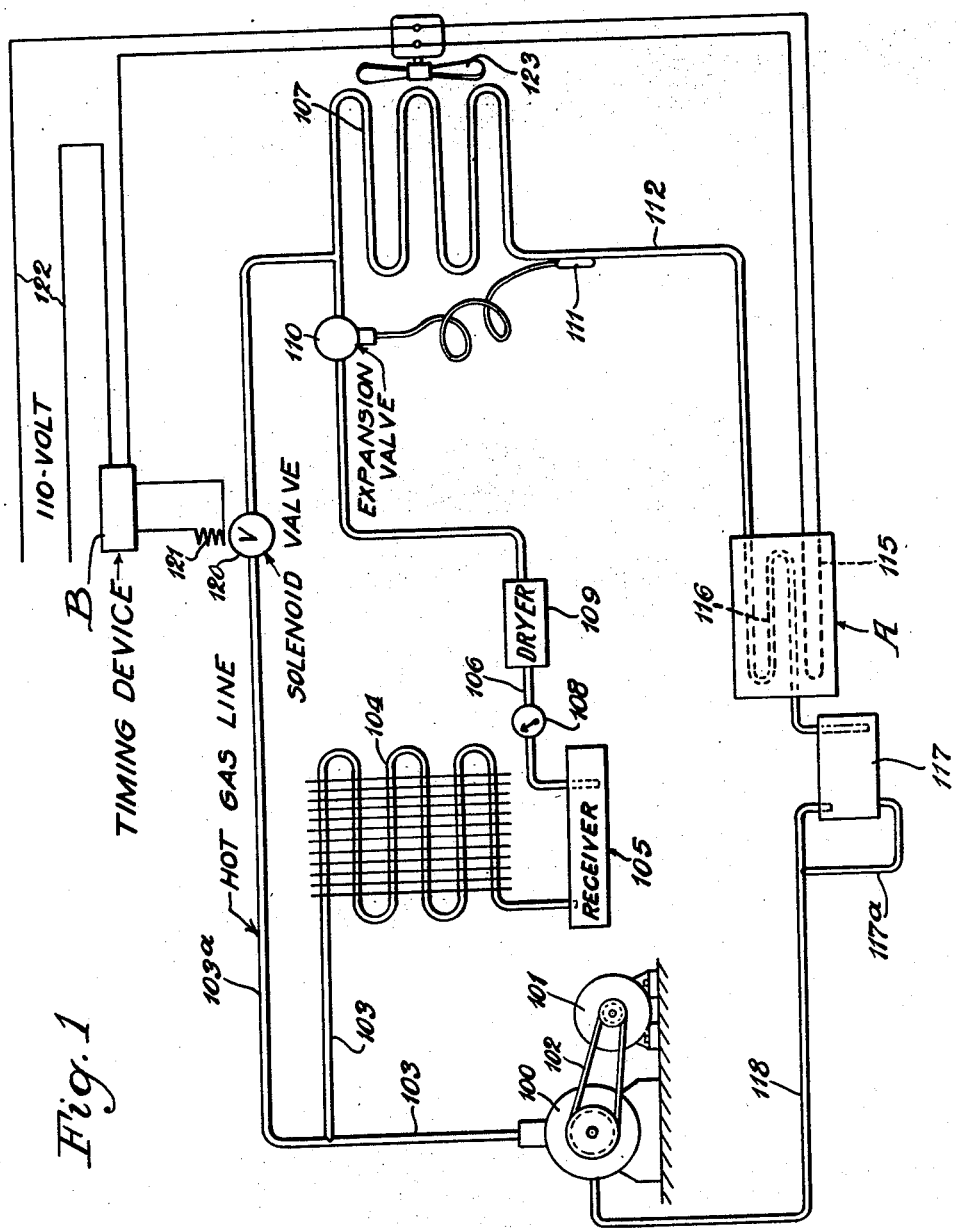

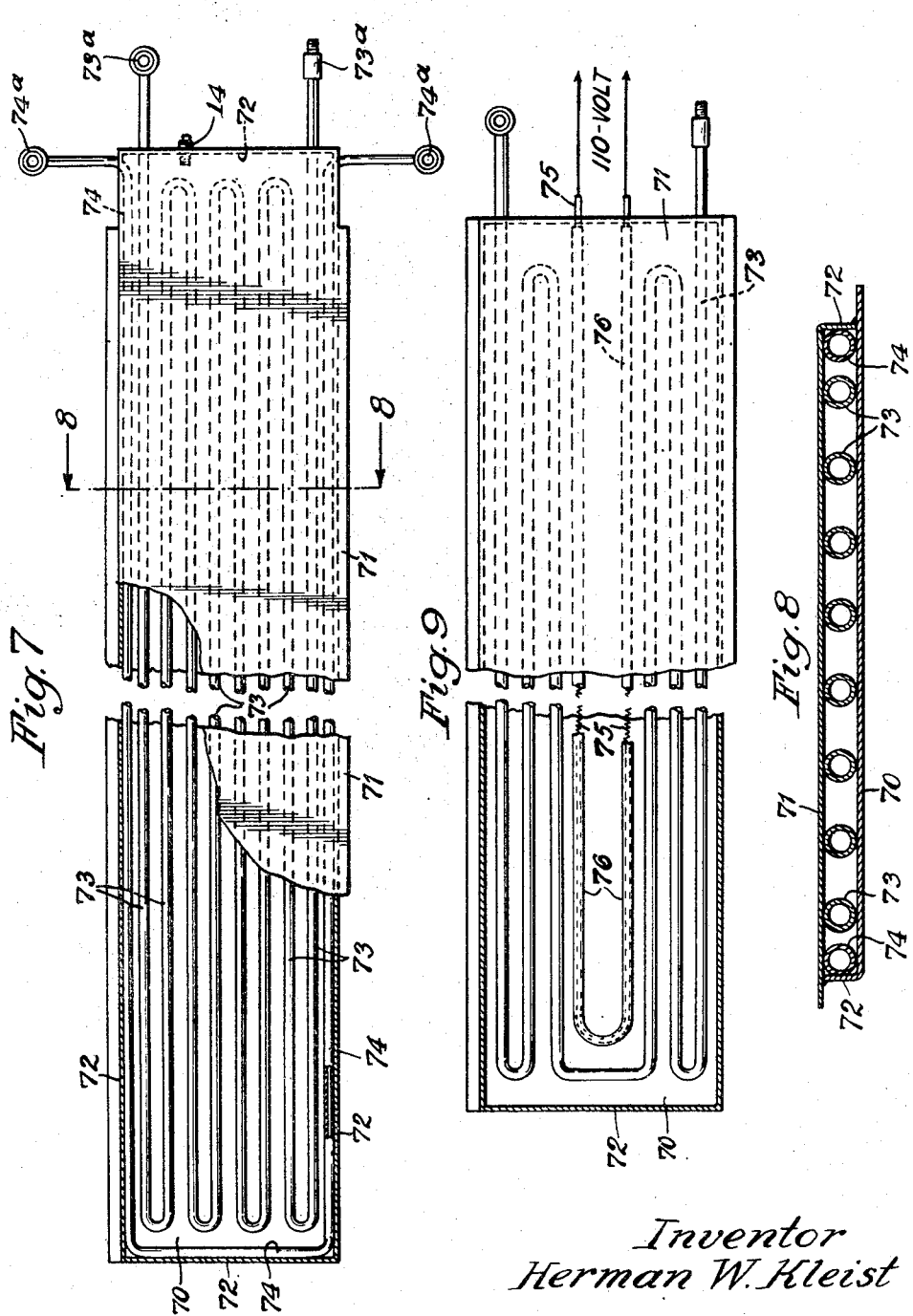

United States Patent Office 2,701,455
Patented Feb. 8, 1955

2,701,455

HEATED PLATE UNIT FOR DEFROSTING SYSTEMS

Herman W. Kleist, Hollywood, Ill., assignor to Dole Refrigerating Company, Chicago, Ill., a corporation of Illinois Application July 23, 1952, Serial No. 300,376

3 Claims. (Cl. 62—126)

My invention relates to an improvement in automatic defrosting systems and in heat interchangers for use therewith. One object is to provide such a system in which a heat interchanger is positioned to vaporize the volatile refrigerant which has been delivered to an evaporator or evaporators in the form of hot gas, to defrost the evaporators, the heat interchanger being located in the suction line between the evaporator or evaporators and the compressor.

Another object is to provide plates which may be used in such a system, to provide a plane-sided plate, which is efficient in use and simple to manufacture.

Another object is to provide an improved plate in which a pressure differential between the interior and the exterior of the plate is employed to hold parts of the plate in heat exchange relationship.

Other objects will appear from time to time in the course of the specification and claims.

The present application is a continuation-in-part of my copending application Serial No. 79,274, filed March 2, 1949, now Patent No. 2,638,754, issued May 19, 1953, for "Stamped Plates."

I illustrate my invention more or less diagrammatically in the accompanying drawings wherein:

Figure 1 is a diagrammatic illustration of my automatic defrosting system;

Figure 2 is a plan view of a heat interchanger;

Figure 3 is a side view of the structure of Figure 2;

Figure 4 is a section, on an enlarged scale, on the line 4—4 of Figure 3, with parts broken away;

Figure 5 is a section similar to Figure 4, through a variant form of unit;

Figure 6 is a section on the line 6—6 of Figure 5;

Figure 7 is a plan view, with parts broken away, of another form of heat interchanger;

Figure 8 is a section on the line 8—8 of Figure 7; and

Figure 9 is a plan view, with parts broken away, of a further form of heat interchanger.

Like parts are indicated by like symbols throughout the specification and drawings.

Referring, first, to Figure 1, 100 illustrates, more or less diagrammatically, a compressor which may, for example, be driven by any suitable motor 101 through a belt 102. 103 indicates a hot gas line or discharge pipe from the pressure side of the compressor 100, which may extend to a suitable condenser structure 104 and therethrough to a suitable receiver 105. 106 is a duct extending to any suitable evaporator structure 107. 108 is a liquid indicator, 109 a suitable dryer, and 110 any suitable expansion valve which may, for example, be controlled by the bulb 111 on the return duct or pipe 112 extending from the evaporator.

A generally indicates a heat interchanger, various forms of which are illustrated in Figures 2 and following. In Figure 1 it is illustrated as having an electric or resistance heating unit 115 and a coil 116 in communication with the return pipe 112. It will be understood that, through an auxiliary receiver 117, the refrigerant continues through the final return duct section 118 to the suction side of the compressor 100. 117a is any suitable oil return for the auxiliary receiver. In the form of my system shown in Figure 1, B indicates any suitable timing device. Its control means do not, of themselves, form part of the present invention, but it will be understood that either by manual or by automatic control the timing device may be actuated, and when actuated it controls the below-described elements.

120 indicates a valve, which may be a solenoid valve, actuated by any suitable coil 121 controlled by the timing device B. When the timing device is actuated the solenoid valve, which is normally in closed position, opens, and permits hot gas to flow along the by-pass 103a, through the valve 120 to the evaporator 117, at a point beyond the expansion valve 110. 122 indicates any suitable power circuit in which the timing device B is included. 123 indicates any suitable fan which may be actuated, preferably, in synchronism with the actuation of the valve 120, to direct air upon the exterior of the evaporator 107 and to assist in the defrosting process.

It will be understood that, in the use of the system diagrammatically shown in Figure 1, many changes in the arrangement and details of parts and elements may be employed. What I consider essential is that I provide, in the return from the evaporator to the suction side of the compressor, some means for re-evaporating the hot gas which has been condensed in the evaporator 107 during the defrosting cycle. I illustrate, diagrammatically, in Figure 1, a heat interchanger which includes an electric heating element 115 and a refrigerant receiving coil 116. It is preferable, although not necessary, to employ, within the unit A, a heat absorption substance, which may, for example, be a liquid, such as glycerine, alcohol and water, or the like. When such a liquid is employed, the coil 115, when put in circuit with a source of electricity, serves to heat the body of liquid, the heat so provided being available to vaporize the condensed volume of the volatile refrigerant flowing from the evaporator during defrosting. It will be understood that I may employ a wide variety of heat interchangers, and may employ electricity as a heating means, or any suitable liquid or gas, heated in any suitable manner.

Figures 2 and following show various types of units or heat interchangers which may be employed. I prefer to employ plates as compact elements having sound structural characteristics. Referring, first, to the form of Figures 2 to 4, 1 generally indicates a plate side wall of sheet metal, shown as plane from edge to edge. 2 generally indicates an intermediate wall of sheet metal which is shown as pressed into proper shape to define, with the wall 1, a refrigerant coil or passage, generally indicated as A. The member 2 may have plane edge portions 3 and intermediate plane portions 4, all of which abut against the inner surface of the side wall 1. They are appropriately secured together. They may, for example, be initially spot-welded, and thereafter seam-welded, in such fashion that the two walls together define an evaporator passage or coil A which is substantially gas-tight from the end 5 to the end 6.

The coil proper is shown as formed by bowed or offset wall portions 7 of the wall 2, which may be of any suitable contour, and which are herein shown as generally rounded and so formed as to be readily made by a pressing operation. It will be understood that the ends of the evaporator passage A, as at 5 and 6, are connected to suitable ducts or tubes 5a and 6a, which may constitute, respectively, inlet and outlet passages for the volatile refrigerant delivered by the pipe 112 of Figure 1 and received by the pipe 118. If the volatile refrigerant is admitted in liquid or partially liquid form through the pipe 5a, it evaporates in the coil space A, and the evaporated refrigerant is discharged along the tube 6a to the pipe 118. The space between the side walls 1 and 10 may be filled, or partly filled, with any suitable heat absorbent liquid, and this liquid may be heated by any suitable resistance, such as is indicated at 115a in Figures 2 and 3.

In designing and using such plates I find it highly desirable to have the sides of the plates plane, and, in most instances, parallel. Such plane-surfaced plates are applicable to a wide variety of uses, in addition to their use as heat interchangers. They may, for example, be employed directly as evaporating plates in which the volatile refrigerant is normally evaporated, in which event the liquid employed can be the usual eutectic. It is frequently important to nest such plates in narrow spaces, the individual plates having adjacent walls separated by air spaces, as in air conditioning units and the like, or in refrigerating units for cooling air or liquids.

In that event, it is important to have the outer surfaces of the plates plane on both sides. I employ a second outside wall 10, shown as plane throughout most of its surface, but as having side wall portions 11 and edge flanges 12 which may be secured to corresponding portions of the edge of the side wall 1, to form a housing or plate which is gas-tight.

It will be understood that I may form a plate otherwise than by the particular shape of edge flanges herein shown, but the structure shown in the drawings is practical and satisfactory. The space between the side wall 10 and the intermediate wall 2, which I indicate as B, may receive an eutectic, or may be air-filled, or may receive glycerine, Prestone, or the like, when the plate is being used as a heat interchanger in such a system, as is shown in Figure 1. In any event, I prefer partially to exhaust the space B. This may be done in any suitable fashion, but I may, for example, employ any suitable pump, not herein shown, to exhaust air through the fitting generally indicated as 14. This fitting may have a duct 15 through which air may be drawn from the interior of the plate. When a suitable pressure differential has been obtained the operation of the pump may be terminated. When this takes place the outside air pressure urges the locking ball 16 against the inlet end of the duct or passage 15. Thereafter, any suitable sealing material may be positioned about the ball 16, if desired, and a tight closure plug 17 may be inserted. As a result, the pressure differential may be permanently, or substantially permanently, maintained, with the outside excess pressure effective to urge the side wall 10 firmly against the crests 7a of the coil structure 2. Thus an adequate heat exchange relationship is maintained between the side plate 10 and the evaporating refrigerant in the coil space A. And the plate is maintained flat and firm, with the side walls 1 and 10 plane, and parallel in relation to each other. If desired, the same fitting may be employed for the initial insertion or the addition of liquid to the interior of the plate.

Whereas a small volume of liquid may be used in the form of Figures 2 to 4, under normal circumstances, where an eutectic or other liquid is used, it is advantageous to provide a relatively large body of liquid. In such event, the form of Figures 5 and 6 may be employed, in which the plate side wall 20 is provided with circumferential walls or flanges 21 which are substantially deeper or broader than the walls 11 of Figure 4. Since this positions the plane portion of the side wall 20 remotely from the pressed coil structure of the intermediate wall 2, I provide a plurality of vanes 22 which may be connected by any suitable cross supports, spacing rods or the like 23. The vanes 22 have straight edges 24 adapted to abut against the inner surface of the side wall 20, when that side wall is inwardly drawn by the above described pressure differential. The vanes 22, at their opposite edges, may engage the opposed surface of the intermediate plate 2. It will be understood, however, that whereas it is advantageous to form the vane edges 25 to conform generally to the coil structure of the intermediate wall 2, it is not necessary to employ micrometric accuracy. The result of the employment of the above described pressure differential is to cause the atmosphere, operating on the exterior surfaces of the side walls 1 and 20, to hold the edges of the vanes 22 in adequate heat exchange relation with the wall 20 on the one hand and with the wall 2 on the other. In order to permit distribution of and expansion of the eutectic, I provide any suitable apertures or broken away portions in the vanes 22. I illustrate, for example, apertures 26. I illustrate a heating unit 115b, illustratively shown as a suitable resistance. Under some circumstances, as when the plate is used as an ordinary evaporator plate for refrigeration, with no defrosting provision, the heating unit or units may be omitted. I illustrate, for example, in the form of Figures 2 to 4, inclusive, a heating resistance 115a which, as a matter of convenience, is shown as including a duct 50 having within it a suitable resistance wire 51 and any suitable insulation 52. This duct 50 may, at the same time, have an outside diameter equal to the space between the plate walls 1 and 10, so that the heating member is in good heat transfer relation with both sides of the plate. It will be understood, of course, that the details of the resistance unit do not of themselves form part of the present invention, and that any suitable resistance may be employed. In Figure 2, I illustrate the resistance unit as positioned between spaced lengths of the evaporator coil 7. 53 and 54 indicate any suitable conductive connections which will be understood to extend to any suitable source of current.

In the form of Figures 5 and 6, the resistance 115b is only diagrammatically illustrated, it being understood that any suitable conductive connection may be provided therefor, and that it may be placed or supported in any suitable manner.

Referring to Figures 7 and 8, I illustrate a form of plate in which the side walls 70 and 71 are sealed around their edges and connected by peripheral portions 72. A refrigerant coil 73 occupies part of the space between the two plate side walls 70 and 71, and the pressure differential, as above described, obtained by the use of the fitting 14, causes the outside atmospheric pressure to hold the walls 70 and 71 in snug and proper heat transfer relationship with the coil 73. At the same time, I provide a heating fluid coil portion 74 which is shown as surrounding the coil 73, within the edges of the plate. The coil 73 has its own inlet and outlet portions 73a, while the coil 74 has its own individual inlet and outlet portions 74a. Any suitable liquid may be admitted through the fitting 14, and may partially or substantially entirely fill the space about the coils and within the plate walls 70 and 71.

Figure 9 illustrates a similar plate, with the difference that in the place of the heating coil 74 a resistance 75 is employed, which preferably, but not necessarily, includes an outer conductive housing or shell 76 of the same gauge as the refrigerant coil 73. Thus, in both forms, the pressure differential maintains the outside walls 70 and 71 in heat transfer relationship with both the refrigerant coils and the heating elements.

It will be realized that, whereas, I have described and illustrated practical and operative units, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

I illustrate, in Figure 1, a more or less schematic or diagrammatic showing of an automatic defrosting system. In Figures 2 and following I have illustrated several forms of heat interchanger. These may advantageously be plates adaptable for other uses. For example, all the forms of plates herein described and shown may be employed not only as heat interchangers in a system such as is shown in Figure 1, but as evaporators for use in refrigeration. In that event, if the heating elements are employed the evaporators may be directly defrosted by application of heat. If such units are to be employed merely as evaporators, and the application of heat directly to the plates is not desired, the heating elements may be omitted.

I illustrate an automatic defrosting system of maximum simplicity and heat interchanger units which are simple, compact, strong, easily installed, and easily shipped. Being flat or plane-sided, they are easily cleaned. When they have to be defrosted they defrost easily, and the frost sloughs off or can easily be cleaned or scraped off. All of the units shown herein may be employed as evaporators, in which event they may be defrosted by direct application of heat to the individual evaporators. They are also adapted for use as heat interchangers in defrosting systems.

Where the unit is being used simply as a truck plate or as a refrigerating plate, then a eutectic may be employed which freezes at some predetermined, desirable temperature. The structure is adaptable and useful, without change, either as an evaporator or as a vaporizer for the specific use above described. It will be understood, also, that where the unit is used as a heat interchanger any suitable material may be employed which has suitable heat absorbing or heat retaining characteristics.

I claim:

1. In a vacuum type plate, two outer plate walls having generally parallel plane surfaced sides and connecting edge portions, said edge portions being secured together in gas-tight relationship, with said plane surfaced sides spaced apart, an intermediate sheet metal wall in the space between said plate walls, forming, with one of said plate walls, a coil space, the opposed portions of said intermediate sheet metal wall and said last mentioned plate wall being secured together in gas-tight relationship, a tubular element positioned between said intermediate sheet metal wall and the opposite plate wall, a resistance heater therewithin, heat storage means surrounding and in heat conductive relationship with said tubular element, and inlet and outlet ducts for the coil formed by said walls.

2. The structure of claim 1, characterized in that the tubular element abuts and is in heat exchange relation with the intermediate sheet metal wall and one of the outer plate walls.

3. The structure of claim 1, characterized by and including spacing means between the intermediate sheet metal wall and the opposite outer plate wall, the tubular element with the resistance heater being supported by said spacing means.

References Cited in the file of this patent

UNITED STATES PATENTS

| Number | Name | Date |
|---|---|---|
| 2,126,285 | Schaaf | Aug. 9, 1938 |
| 2,217,702 | Kleist | Oct. 15, 1940 |
| 2,281,770 | Hoesel | May 5, 1942 |
| 2,440,146 | Kramer | Apr. 20, 1948 |
| 2,487,674 | Rott | Nov. 8, 1949 |
| 2,526,379 | Maseritz | Oct. 17, 1950 |
| 2,611,587 | Boling | Sept. 23, 1952 |
| 2,637,983 | Malkoff et al. | May 12, 1953 |
| 2,638,754 | Kleist | May 19, 1953 |